US011234171B2

United States Patent
Lundqvist et al.

(10) Patent No.: US 11,234,171 B2
(45) Date of Patent: Jan. 25, 2022

(54) NETWORK NODES AND METHODS THEREOF

(71) Applicant: Huawei Technologies Co., Ltd., Shenzhen (CN)

(72) Inventors: Henrik Lundqvist, Kista (SE); Henrik Olofsson, Kista (SE); Johan Christer Qvarfordt, Kista (SE); Hongzhuo Zhang, Shanghai (CN); Kari Juhani Leppanen, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/833,085

(22) Filed: Mar. 27, 2020

(65) Prior Publication Data

US 2020/0229051 A1 Jul. 16, 2020

Related U.S. Application Data

(63) Continuation of application No. PCT/EP2017/074789, filed on Sep. 29, 2017.

(51) Int. Cl.
*H04W 36/00* (2009.01)
*H04W 76/15* (2018.01)
(Continued)

(52) U.S. Cl.
CPC ....... *H04W 36/0083* (2013.01); *H04W 24/02* (2013.01); *H04W 36/0061* (2013.01);
(Continued)

(58) Field of Classification Search
CPC ..... H04W 76/15; H04W 36/08; H04W 76/19; H04W 36/0069; H04W 72/04;
(Continued)

(56) References Cited

U.S. PATENT DOCUMENTS

2012/0195255 A1* 8/2012 Nylander ............. H04W 60/04
370/328
2015/0208299 A1 7/2015 McLaughlin et al.
(Continued)

FOREIGN PATENT DOCUMENTS

CN 101568196 A 10/2009
CN 101841936 A 9/2010
(Continued)

OTHER PUBLICATIONS

"Support for New Radio ANR," 3GPP TSG-RAN WG3 Meeting#96, Hangzhou, P.R. China, R3-171758, pp. 1-24, 3rd Generation Partnership Project, Valbonne France (May 15-19, 2017).
(Continued)

*Primary Examiner* — Daniel Lai
(74) *Attorney, Agent, or Firm* — Leydig, Voit & Mayer, Ltd.

(57) ABSTRACT

A first network node is configured to: group served cells into a first set of cells and at least one second set of cells, the cells in the first set of cells being associated with a first set of cell information and cells in the second set of cells being associated with a second set of cell information; generate a setup request including a first indication indicating the first set of cells and their respective first set of cell information and the second set of cells and their respective second set of cell information; and transmit the setup request to the second network node. The second network node is configured to receive a setup request from a first network node, the setup request including a first indication.

15 Claims, 5 Drawing Sheets

(51) Int. Cl.
*H04W 76/27* (2018.01)
*H04W 24/02* (2009.01)
*H04W 48/16* (2009.01)
*H04W 88/06* (2009.01)
*H04W 92/20* (2009.01)

(52) U.S. Cl.
CPC ........... *H04W 48/16* (2013.01); *H04W 76/15* (2018.02); *H04W 76/27* (2018.02); *H04W 88/06* (2013.01); *H04W 92/20* (2013.01)

(58) Field of Classification Search
CPC ......... H04W 36/0058; H04W 72/0426; H04W 88/08; H04W 16/14; H04W 24/02; H04W 36/0072; H04W 36/18; H04W 36/0005; H04W 36/0055; H04W 56/001; H04W 72/0406; H04W 74/002; H04W 28/06; H04W 36/0033; H04W 24/04; H04W 36/00; H04W 36/0077; H04W 72/02; H04W 36/0061; H04W 36/0083; H04W 84/18; H04W 28/08; H04W 28/12; H04W 36/0016; H04W 36/0022; H04W 36/28; H04W 8/186; H04W 76/27; H04W 48/16; H04W 88/06; H04W 92/20; H04L 5/00; H04L 5/0092
See application file for complete search history.

(56) References Cited

U.S. PATENT DOCUMENTS

| | | | | |
|---|---|---|---|---|
| 2015/0334042 | A1* | 11/2015 | Katayama | H04L 12/4641 455/452.2 |
| 2016/0302122 | A1 | 10/2016 | Masini et al. | |
| 2016/0316467 | A1 | 10/2016 | Won et al. | |
| 2018/0220342 | A1* | 8/2018 | Farooqi | H04W 36/00835 |
| 2018/0262903 | A1* | 9/2018 | Ryan | H04W 4/90 |
| 2019/0215829 | A1* | 7/2019 | MacKenzie | H04W 16/10 |

FOREIGN PATENT DOCUMENTS

| | | |
|---|---|---|
| CN | 102348286 A | 2/2012 |
| CN | 102595417 A | 7/2012 |

OTHER PUBLICATIONS

"TP for 36.423 on EN-DC X2 setup procedure," 3GPP TSG-RAN WG3 Meeting #97, Berlin, Germany, R3-172799, pp. 1-12, 3rd Generation Partnership Project, Valbonne France (Aug. 21-25, 2017).
"Stage 3 CR of X2 setup and node configuration update for option 3," 3GPP TSG RAN WG3 Meeting #97bis Prague, Czech Republic, R3-174197, pp. 1-12, 3rd Generation Partnership Project, Valbonne France (Oct. 9-13, 2017).
"Selection of served cell info on Xn and Xx/X2," 3GPP TSG-RAN WG3 Meeting #97, Berlin, Germany, R3-172994, pp. 1-3, 3rd Generation Partnership Project, Valbonne France (Aug. 21-25, 2017).
"Discussion on X2/Xn setup procedure," 3GPP TSG-RAN WG3 Meeting #97, Berlin, Germany, R3-172798, pp. 1-2, 3rd Generation Partnership Project, Valbonne France (Aug. 21-25, 2017).
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.4.0, pp. 1-753, 3rd Generation Partnership Project, Valbonne France (Sep. 2017).
"3rd Generation Partnership Project; Technical Specification Group Radio Access Network; Evolved Universal Terrestrial Radio Access (E-UTRA); Physical channels and modulation (Release 14)," 3GPP TS 36.211 V14.4.0, pp. 1-197, 3rd Generation Partnership Project, Valbonne France (Sep. 2017).
"3rd Generation Partnership Project; Technical Specification Group Radio Access Network; Evolved Universal Terrestrial Radio Access (E-UTRA); Base Station (BS) radio transmission and reception (Release 15)," 3GPP TS 36.104 V15.0.0, pp. 1-243, 3rd Generation Partnership Project, Valbonne France (Sep. 2017).
"3rd Generation Partnership Project; Technical Specification Group Core Network and Terminals; Numbering, addressing and identification (Release 15)," 3GPP TS 23.003 V15.1.0, pp. 1-109, 3rd Generation Partnership Project, Valbonne France (Sep. 2017).
"3rd Generation Partnership Project; Technical Specification Group Radio Access Network; Evolved Universal Terrestrial Radio Access Network (E-UTRAN); X2 application protocol (X2AP) (Release 14)," 3GPP TS 36.423 V14.3.0, pp. 1-242, 3rd Generation Partnership Project, Valbonne France (Jun. 2017).

* cited by examiner

NETWORK NODES AND METHODS THEREOF

CROSS-REFERENCE TO RELATED APPLICATIONS

This application is a continuation of International Application No. PCT/EP2017/074789, filed on Sep. 29, 2017, the disclosure of which is hereby incorporated by reference in its entirety.

FIELD

The invention relates to network nodes. Furthermore, the invention also relates to corresponding methods and a computer program.

BACKGROUND

To simplify the management of neighbour cell relations in mobile networks an automatic neighbour relation (ANR) functionality has been introduced in long term evolution (LTE). The neighbour relations are used in mobility to configure the right measurements and prepare the right neighbour cells. Further, the neighbour relations are also used to setup direct logical interfaces between the base stations that have neighbour cells. Examples of logical interfaces are X2-, Xx- and Xn-interfaces. In this way the network can add new X2 interfaces when a neighbour relation is discovered, which reduces the need for manual network configuration.

The dynamic X2-setup procedure in LTE (TS 36.423) involves an exchange of X2 setup request and X2 setup response between two evolved-universal mobile telecommunications service (UMTS) terrestrial radio access network (E-UTRAN) NodeB (eNBs). The X2 setup request and the setup response reset the X2 interface and its related information; and therefore, include the complete list of cells served by the respective eNBs.

When the X2 interface has been setup between two eNBs, they may use the eNB configuration update procedure to update, for example, the neighbour information by exchanging an updated neighbour information list. The information exchanged are sometimes called information elements (IEs). Table 1 gives examples of the information elements in an X2 setup request according to technical specification (TS) 36.423.

TABLE 1 examples of Information Elements

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 ... <maxCellineNB> | | Complete list of cells served by the eNB | YES | reject |
| >Served Cell Information | M | | 9.2.8 | | — | — |
| >Neighbour Information | | 0 ... <maxnoof Neighbours> | | | — | — |
| >>ECGI | M | | ECGI 9.2.14 | E-UTRAN Cell Global Identifier of the neighbour cell | — | — |
| >>PCI | M | | INTEGER (0 ... 503, ...) | Physical Cell Identifier of the neighbour cell | — | — |
| >>EARFCN | M | | 9.2.26 | DL EARFCN for FDD or EARFCN for TDD | — | — |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the EARFCN IE is ignored. | YES | reject |
| GU Group Id List | | 0 ... <maxfPools> | | List of all the pools to which the eNB belongs | GLOBAL | reject |
| >GU Group Id | M | | 9.2.20 | | — | — |
| LHN ID | O | | 9.2.83 | | YES | ignore |

For 5G or new radio (NR) it is expected that distributed NR NodeB (gNBs) will be common, where each gNB can contain one central unit and many distributed units that implement different parts of the functionality of the gNB. This allows a gNB to scale to very large number of cells, possibly thousands of cells. Since the neighbour cell information is only needed for cells which are neighbours it may be excessive to share information about all the served cells and all neighbour information. With a large number of cells there will be a lot of information for the gNBs to maintain with corresponding signalling of information updates.

SUMMARY

The present disclosure provides a solution that mitigates or solves the drawbacks and problems of conventional solutions.

According to a first aspect of the disclosure, the above mentioned and other objectives are achieved with a first network node for a wireless communication system, the first network node being configured to:

group cells served by the first network node into a first set of cells and at least one second set of cells, wherein cells in the first set of cells are associated with a first set of cell information and cells in the second set of cells are associated with a second set of cell information, wherein the first set of cell information and the second set of cell information are different sets of cell information;

generate a setup request comprising a first indication indicating the first set of cells and their respective first set of cell information and the second set of cells and their respective second set of cell information; and transmit the setup request to the second network node.

The cells served by the first network node can therefore be grouped into two or more second sets of cells depending on application.

It should herein be understood that each cell belonging to the first set of cells is associated with the first set of cell information. Accordingly, each cell belonging to the second set of cells is associated with a second set of cell information.

The setup request is a request message for setting up a logical interface with the second network node. The logical interface is set between the first network node and the second network node when a corresponding setup response has been received from the second network node The terminology "first indication" is a convenient labelling for distinguishing from other indication, such as "second indication" herein. Generally, the first indication indicates sets of cells served by the first network node, while the second indication indicates sets of cells served by the second network node.

A first network node according to the first aspect provides a number of advantages over conventional solutions. The first network node may share information about a well-defined limited set of its served cells to the second network node. This makes the interaction between neighbouring network nodes of the wireless communication system with very large number of cells more efficient. This also means that the signalling between the network nodes can be reduced. The network nodes can use the information about cells served by neighbour network nodes for multiple purposes. In particular, between cells that are direct neighbours the network nodes need to handle handover procedures and interference coordination, which require detailed information about the cell configuration in the neighbour network node to work efficiently. For cells that are not direct neighbours to the cells of the second network node, the second network node does not need detailed information. However, it may be beneficial to have some information also about cells that are not direct neighbours. For example, a network node may use information about which physical cell identities are used in cells of the neighbour node in order to select cell identities for its own cells without causing ambiguities.

In an implementation form of a first network node according to the first aspect, the first set of cell information and the second set of cell information differ in at least one information element.

The mentioned information elements can be given by communication standards, such as LTE and NR. Further, this implementation form means that cell information about cells of the first set does never fully overlap with cell information about cells of the second set.

An advantage with this implementation form is that the information elements provided for the cells in one set can be partially different from the information elements provided for cells in other sets. The information provided for different sets may therefore be tailored for different purposes, for example configuration of user equipment (UEs) that are using specific services, such as multimedia broadcast multicast services (MBMS), or UEs in radio resource control (RRC) inactive state. Hence, reduced signalling overhead is possible.

In an implementation form of a first network node according to the first aspect, the first set of cell information and the second set of cell information comprises different number of cell information elements.

An advantage with this implementation form is that different sets of cells can have different amounts of cell information exchanged over the interface, which can make the signalling and cell information management more efficient. It can reduce the message size, and the amount of cell information that needs to be stored at the network nodes. It also reduces the need to keep the cell information updated. Since the cell information is kept updated by means of configuration update signalling the overall signalling can be reduced.

In an implementation form of a first network node according to the first aspect, the setup request further comprises a second indication indicating at least one third set of cells served by the second network node.

An advantage with this implementation form is that the first network node can indicate to the second network node, which cells it needs detailed cell information about, and cells that it needs specific information about. For example, it may indicate the cells it needs detailed served cell information about, and for all other cells it will only get a limited information, such as the cell IDs.

In an implementation form of a first network node according to the first aspect, the at least one third set of cells is indicated by at least one of: a frequency carrier, a number of tiers, a radio access network notification area, and a tracking area.

An advantage with this implementation form is that the first network node can indicate the set of cells to the second network node in ways that are efficient for the specific purpose that the cell information is requested for. It is an effective way of indicating sets of cells that are of interest although they may not be neighbours of any cells to the first network node. For example, the first network node may need information regarding parameters for configuration of client devices (e.g. UEs) in inactive mode for a set of cells that belong to a certain radio network area. It may then indicate the Radio Network Area Code to get information about all the cells in the indicated radio network area. Typically, the request may include a single criteria for each set of cells, such as all cells of a frequency carrier in one set, or all cells within a number of neighbour tiers of an indicated cell, etc.

In an implementation form of a first network node according to the first aspect, the second indication further indicates a third set of cell information associated with the at least one third set of cells.

The third set of cell information can be the same as the first set of cell information or the second set of cell information. However, the third set of cell information can also be different to the first set of cell information and the second set of cell information.

An advantage with this implementation form is that the first network node may indicate the cell information it needs about a certain set of cells. This can be used to indicate a known set of information elements, e.g. the same as used for information elements used for the first set of cells or the second set of cells served by the first network node. It also has the advantage that the first network node can explicitly indicate information elements that shall be included in the cell information about the served cells of the second network node.

In an implementation form of a first network node according to the first aspect, receive a setup response from the second network node in response to the transmission of the setup request to the second network node, wherein the setup response comprises an indication of the at least one third set of cells and their respective third set of cell information.

This completes the interface set up and provides the receiving node with the requested information about which of the served cells of the second network node match the indication in the request. It also provides the first network node with the requested information about the served cells of the second network node.

In an implementation form of a first network node according to the first aspect, the first network node is configured to: generate a re-configuration request associated with the at least one third set of cells, wherein the re-configuration request instructs at least one of a removal of a cell served by the second network node from the at least one third set of cells or an adding of a cell served by the second network node to the at least one third set of cells; and transmit the re-configuration request to the second network node.

This has the advantage that the first network node can indicate to the second network node cells that it does not need detailed cell information about, or cells that it needs more cell information about by deleting or adding them to third sets of cells with more or less cell information. It can therefore dynamically change the third sets of cells in the different sets when it learns more about the network topology during the operation of the network.

In an implementation form of a first network node according to the first aspect, the first network node is configured to:
update cell information for a cell of the first set of cells or the at least one second set of cells;
generate a network node configuration update comprising the updated cell information for the cell if the cell belongs to the first set of cells and the updated cell information belongs to the first set of cell information, or if the cell belongs to the at least one second set of cells and the updated cell information belongs to the second set of cell information; and
transmit the network node configuration update to the second network node.

This has the advantage that there is less need to send network node configuration messages over the logical interface associated with the setup request, compared to conventional solution where a large set of information elements about every served cells is being shared with the neighbour network nodes. This can limit the amount of signalling over the logical interface.

In an implementation form of a first network node according to the first aspect, the first network node is configured to group the cells served by the first network node into the first set of cells and the at least one second set of cells according to a pre-defined rule.

The predefined rule can, e.g., be given by communication standards, such as LTE and NR.

This has the advantage that the cells can be grouped into different sets of cells in a way that is predictable for other network nodes. For example, the cells may be grouped based on their carrier frequency, and the second network nodes may only need to receive detailed cell information about the radio configuration about cells on the same frequency carrier as its own cells to avoid interference problems.

In an implementation form of a first network node according to the first aspect, the first network node is configured to group the cells served by the first network node into the first set of cells and the at least one second set of cells based on a distance between a cell of the cells served by the first network node and a cell served by the second network node.

This has the advantage that the second network node may receive detailed information about the cells that are located in a neighbourhood of its own cells. If the first network node has a large number of cells spanning a large area it may be sufficient for the second network node to take into account the configuration of the cells that are close to its own served cells.

According to a second aspect of the disclosure, the above mentioned and other objectives are achieved with a second network node for a wireless communication system, the second network node being configured to: receive a setup request from a first network node, wherein the setup request comprises a first indication indicating a first set of cells served by the first network node and their respective first set of cell information and at least one second set of cells served by the first network node and their respective second set of cell information, wherein the first set of cell information and the second set of cell information are different sets of cell information.

The second network node can be configured to generate a setup response in response to the reception of the setup request and further to transmit the generated setup response to the first network node. Moreover, the cell information about the cells of the first set and cells of the second set can be stored and/or used for further processing, such as used in mobility procedures, etc.

A second network node according to the second aspect provides a number of advantages over conventional solutions. The second network node receives cell information about the served cells of the first network node that is adapted for its own operation. For each set of cells it may receive only the information that is needed for configuration of its own served cells and its own served client devices. For example, one set of cells may include cells that are likely neighbours of cells in the second network node, and the second network node may use this information to configure mobility measurements for connected client devices, while another set of cells may contain cells that a client device may move to while it is in inactive state.

In an implementation form of a second network node according to the second aspect, wherein the setup request further comprises a second indication indicating at least one third set of cells served by the second network node; and wherein the second network node is configured to:

generate a setup response in response to the reception of the setup request, wherein the setup response comprises an indication of the at least one third set of cells and their respective third set of cell information; and transmit the setup response to the first network node.

There are different solutions to how the second network node knows the third set of cell information. One example is the use of a standardized list of cell information, such as a list of information elements.

An advantage with this implementation form is that the second network node generates a response that contains information about its served cells that is tailored to the requirements of the first network node. The second network node can use the indication from the first network node to determine which cells shall belong to which set of cells, and the information elements to be provided for the cells of each set of cells.

In an implementation form of a second network node according to the second aspect, wherein the at least one third set of cells is indicated by at least one of: a frequency carrier, a number of tiers, a radio access network notification area, and a tracking area.

An advantage with this implementation form is that the second network node can use its local information about the configuration of its served cells to group the cells into sets according to indications provided by the first network node according to its requirement for served cell information from the second network node.

In an implementation form of a second network node according to the second aspect, wherein the second indication further indicates the third set of cell information associated with the at least one third set of cells.

In this solution, the third set of cell information is directly signalled to the second network node.

This has the advantage that the first network node can indicate which information elements shall be included in the sets of information for a specific third set of cells in the second network node. This allows a flexible definition of cell information that makes is simpler to introduce new features in the network that requires specific cell information.

In an implementation form of a second network node according to the second aspect, the second network node is configured to:

receive a re-configuration request associated with the a least one third set of cells from the first network node, wherein the re-configuration request instructs at least one of a removal of a cell served by the second network node from the at least one third set of cells or an adding of a cell served by the second network node to the at least one third set of cells;

update the at least one third set of cells according to the re-configuration request; and transmit an acknowledgement associated with the re-configuration request to the first network node.

This has the advantage that the second network node can adapt the cell grouping into the sets of cells according to updated requirements of the first network node. For example, the first network node may move a cell from one third set of cells to another third set of cells by adding and removing the cell from the respective third sets of cells, if it has determined that the information required about the cell has changed. This may happen due to a re-configuration of its own cell parameters or due to introduction of new services, or due to changes in the physical surroundings.

According to a third aspect of the disclosure, the above mentioned and other objectives are achieved with a method in a first network node for a wireless communication system, the method comprising:

grouping cells served by the first network node into a first set of cells and at least one second set of cells, wherein cells in the first set of cells are associated with a first set of cell information and cells in the second set of cells are associated with a second set of cell information, wherein the first set of cell information and the second set of cell information are different sets of cell information;

generating a setup request comprising a first indication indicating the first set of cells and their respective first set of cell information and the second set of cells and their respective second set of cell information; and transmitting the setup request to the second network node.

The method according to the third aspect can be extended into implementation forms corresponding to the implementation forms of the first network node according to the first aspect. Hence, an implementation form of the method comprises the feature(s) of the corresponding implementation form of the first network node.

The advantages of the methods according to the third aspect are the same as those for the corresponding implementation forms of the first network node according to the first aspect.

According to a fourth aspect of the disclosure, the above mentioned and other objectives are achieved with a method in a second network node for a wireless communication system, the method comprising:

receiving a setup request from a first network node, wherein the setup request comprises a first indication indicating a first set of cells served by the first network node and their respective first set of cell information and at least one second set of cells served by the first network node and their respective second set of cell information, wherein the first set of cell information and the second set of cell information are different sets of cell information.

The method according to the fourth aspect can be extended into implementation forms corresponding to the implementation forms of the second network node according to the second aspect. Hence, an implementation form of the method comprises the feature(s) of the corresponding implementation form of the second network node.

The advantages of the methods according to the fourth aspect are the same as those for the corresponding implementation forms of the second network node according to the second aspect.

The disclosure also relates to a computer program, characterized in code means, which when run by processing means causes said processing means to execute any method according to the present disclosure. Further, the disclosure also relates to a computer program product comprising a computer readable medium and said mentioned computer program, wherein said computer program is included in the computer readable medium, and comprises one or more from the group: ROM (Read-Only Memory), PROM (Programmable ROM), EPROM (Erasable PROM), Flash memory, EEPROM (Electrically EPROM) and hard disk drive.

Further applications and advantages of the present disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
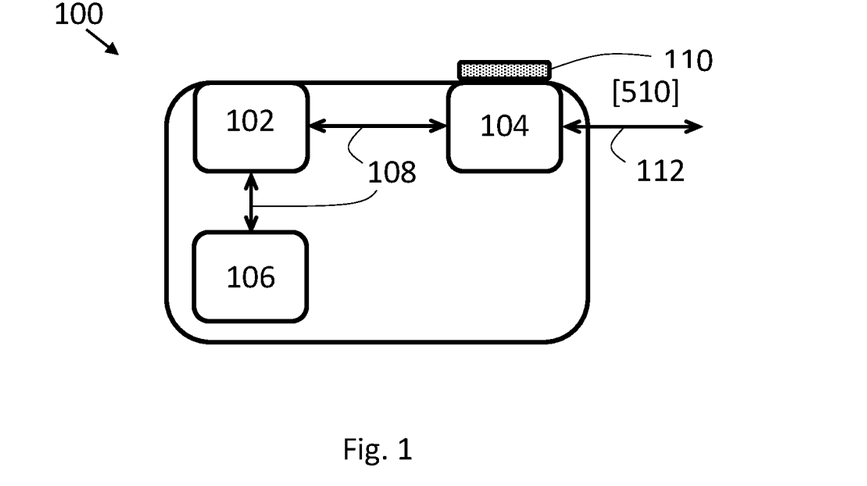
FIG. 1 shows a first network node according to an embodiment of the disclosure.

FIG. 1 shows a first network node 100 according to an embodiment of the disclosure. In the implementation shown in FIG. 1, the first network node 100 comprises a processor 102, a transceiver 104, and a memory 106. The processor 102 is coupled to the transceiver 104 and the memory 106 by communication means 108. The first network node 100 may be configured for both wireless and wired communications in wireless and wired communication systems, respectively. The wireless communication capability is provided with an antenna 110 coupled to the transceiver 104, while the wired communication capability is provided with a wired communication interface 112 coupled to the transceiver 104.

That the first network node 100 is configured to perform certain actions should in this disclosure be understood to mean that the first network node 100 comprises suitable means, such as e.g. the processor 102 and the transceiver 104, configured to perform said actions.

Figure 5:
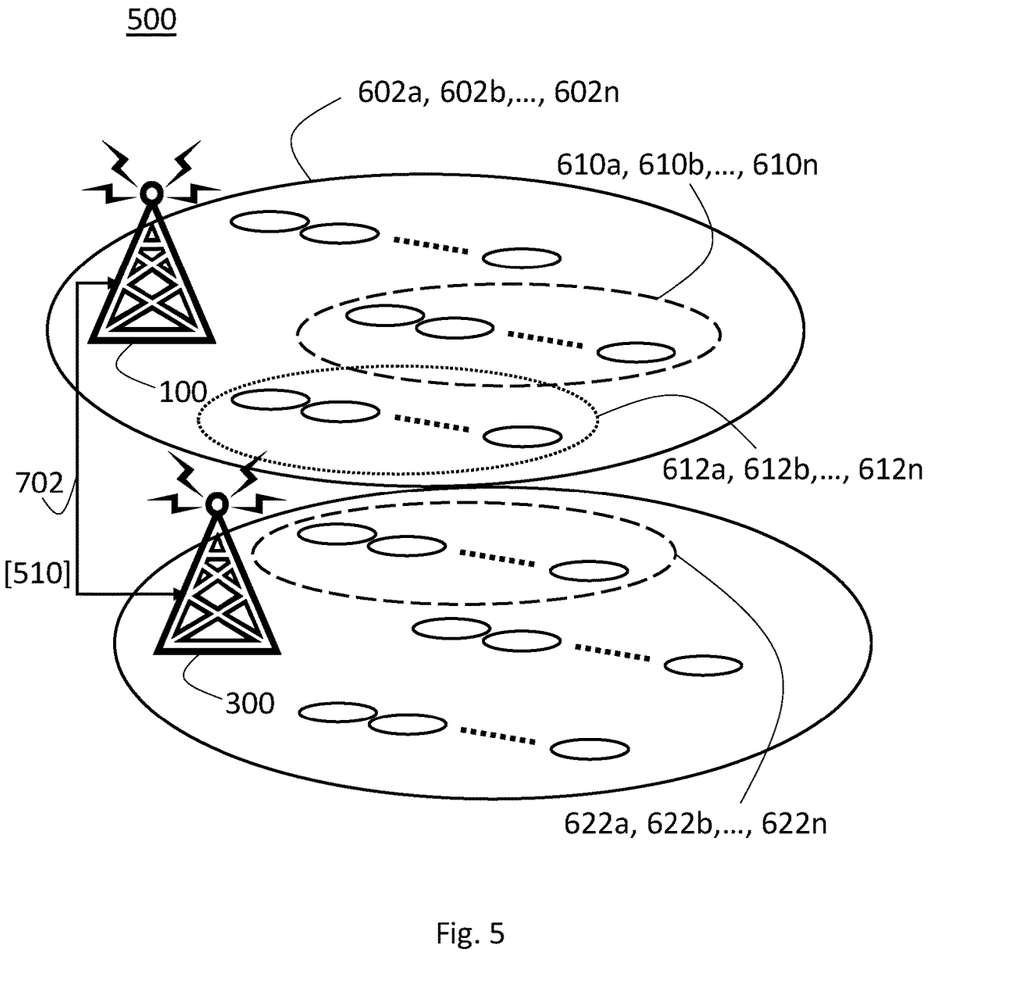
FIG. 5 shows a wireless communication system according to an embodiment of the disclosure.

With reference to FIG. 1 and FIG. 5, the first network node 100 herein is configured to group cells 602a, 602b, . . . , 602n served by the first network node 100 into a first set of cells 610a, 610b, . . . , 610n and at least one second set of cells 612a, 612b, . . . , 612n. The cells in the first set of cells 610a, 610b, . . . , 610n are associated with a first set of cell information and cells in the second set of cells 612a, 612b, . . . , 612n are associated with a second set of cell information. The first set of cell information and the second set of cell information are different sets of cell information. The first network node 100 is further configured to generate a setup request 510 comprising a first indication indicating the first set of cells 610a, 610b, . . . , 610n and their respective first set of cell information and the second set of cells 612a, 612b, . . . , 612n and their respective second set of cell information. The first network node 100 is further configured to transmit the setup request 510 to the second network node 300.

Figure 2:
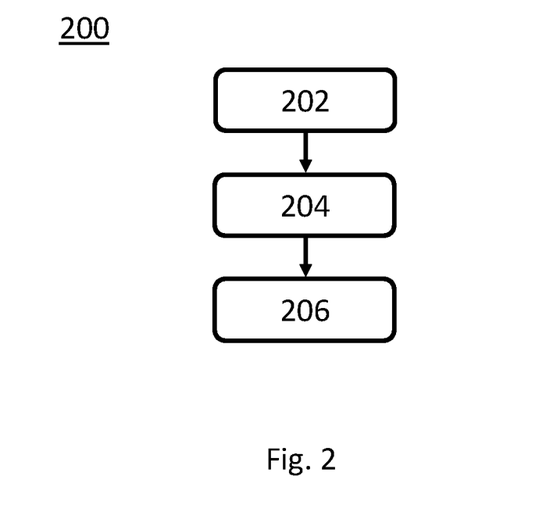
FIG. 2 shows a method for a first network node according to an embodiment of the disclosure.

FIG. 2 shows a flow chart of a method 200, which may be executed in a first network node 100, such as the one shown in FIG. 1. The method 200 comprises grouping 202 cells 602a, 602b, . . . , 602n served by the first network node 100 into a first set of cells 610a, 610b, . . . , 610n and at least one second set of cells 612a, 612b, . . . , 612n. The cells in the first set of cells 610a, 610b, . . . , 610n are associated with a first set of cell information and cells in the second set of cells 612a, 612b, . . . , 612n are associated with a second set of cell information. The first set of cell information and the second set of cell information are different sets of cell information. The method 200 further comprises generating 204 a setup request 510 comprising a first indication indicating the first set of cells 610a, 610b, . . . , 610n and their respective first set of cell information and the second set of cells 612a, 612b, . . . , 612n and their respective second set of cell information. The method 200 further comprises transmitting 206 the setup request 510 to the second network node 300.

The grouping of the cells served by the first network node 100 can be performed in a number of different ways. In one solution, the grouping is performed according to pre-defined rules e.g. given by communication standards. Such pre-defined rules may group together cells belonging to the same radio access network notification areas, cells served by the same distributed units, cells providing specific services, or cells operating at specific carrier frequencies. In another solution, the cells 602a, 602b, . . . , 602n served by the first network node 100 are grouped based on a distance between a cell of the cells 602a, 602b, . . . , 602n served by the first network node 100 and a cell served by the second network node 300. The distance can either be expressed as a physical (spatial) distance, or it may be expressed related to the radio network topology, e.g. as a number of neighbour cell tiers. Mentioned distance could also be defined related to typical client device (such as a UE) mobility patterns, so that it captures the paths that client devices are typically taking through the network, e.g. a distance that 90 percent of the client devices will not exceed within ten seconds of being handed over to the first network node 100 from the second network node 300.

Furthermore, the first network node 100 and the second network node 300 may be part of a network of a wireless communication system 500, such as LTE and NR. The first network node 100 and the second network node 300 can e.g. be network access nodes or network control nodes of the network.

Figure 3:
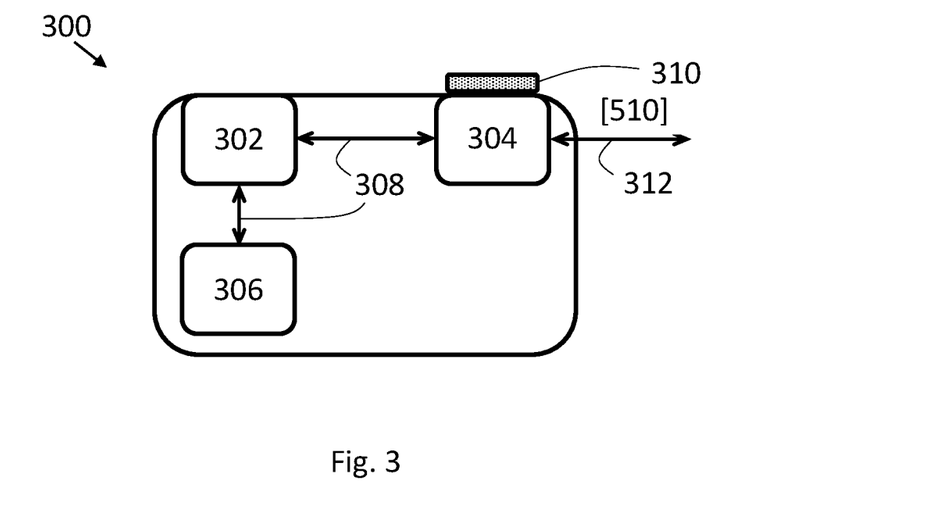
FIG. 3 shows a second network node according to an embodiment of the disclosure.

FIG. 3 shows a second network node 300 according to an embodiment of the disclosure. In the implementation shown in FIG. 3, the second network node 300 comprises a processor 302, a transceiver 304 and a memory 306. The processor 302 is coupled to the transceiver 304 and the memory 306 by communication means 308. The second network node 300 may be configured for both wireless and wired communications in wireless and wired communication systems, respectively. The wireless communication capability is provided with an antenna 310 coupled to the transceiver 304, while the wired communication capability is provided with a wired communication interface 312 coupled to the transceiver 304.

That the second network node 300 is configured to perform certain actions should in this disclosure be understood to mean that the second network node 300 comprises suitable means, such as e.g. the processor 302 and the transceiver 304, configured to perform said actions.

With reference to FIG. 3 and FIG. 5, the second network node 300 herein is configured to receive a setup request 510 from a first network node 100. The setup request 510 comprises a first indication indicating a first set of cells 610a, 610b, . . . , 610n served by the first network node 100 and their respective first set of cell information and at least one second set of cells 612a, 612b, ..., 612n served by the first network node 100 and their respective second set of cell information. The first set of cell information and the second set of cell information are different sets of cell information. The difference in cell information content will be described more in detail in the following disclosure.

Figure 4:
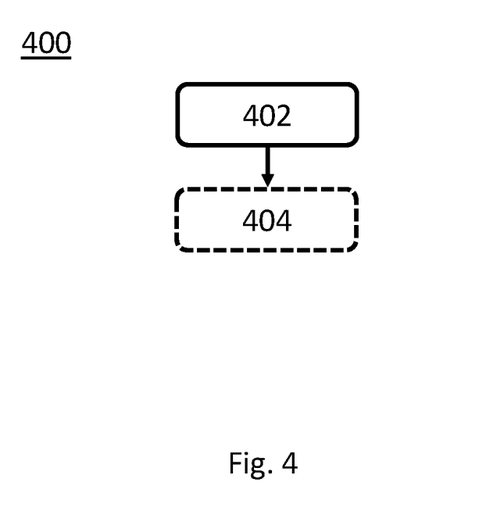
FIG. 4 shows a method for a second network node according to an embodiment of the disclosure.

FIG. 4 shows a flow chart of a method 400 which may be executed in a second network node 300, such as the one shown in FIG. 3. The method 400 comprises receiving 402 a setup request 510 from a first network node 100. The setup request 510 comprises a first indication indicating a first set of cells 610a, 610b, ..., 610n served by the first network node 100 and their respective first set of cell information and at least one second set of cells 612a, 612b, ..., 612n served by the first network node 100 and their respective second set of cell information. The first set of cell information and the second set of cell information are different sets of cell information. The method 400 can comprises an additional step(s) illustrated with the dashed box 404. The additional step 404 can e.g. comprise further processing, such as interference control, power control, transmit diversity, secondary network node addition for a client device in dual connectivity, configuration of cell identities, configuration of time division duplex (TDD) uplink (UL) and downlink (DL) time frames, configuration of reference signals, etc.

FIG. 5 shows a wireless communication system 500 according to an embodiment of the disclosure. The wireless communication system 500 comprises in this example a first network node 100 and a second network node 300 belonging to the same network. A logical interface 702 between the first network node 100 and the second network node 300 is also illustrated in FIG. 5. The logical interface 702 is set up by the use of the setup request 510 transmitted from the first network node 100 to the second network node 300. Furthermore, a plurality of cells is also shown in FIG. 5. Cells 602a, 602b, ..., 602n served by the first network node 100 has been grouped into a first set of cells 610a, 610b, ..., 610n and at least one second set of cells 612a, 612b, ..., 612n. Also, a third set of cells 622a, 622b, ..., 622n served by the second network node 300 is also shown in FIG. 5, but it should be noted that the cells served by the second network node 300 can be grouped into one or more third set of cells. The signalling according to embodiments of the disclosure between the first network node 100 and the second network node 300 is performed over the logical interface 702 in this example but is not limited thereto. It is further to be noted that the logical interface 702 may be a wired communication interface, a wireless communication interface, or a combination of a wired communication interface and a wireless communication interface. The details of the present signalling interworking between the first network node 100 and the second network node 300 will be described with reference to FIGS. 6 to 9.

In a LTE/NR system, embodiments of the disclosure may target at the setup of the Xn interface between gNBs, as well as the X2 or Xn interface between gNB and eNBs and a possible extension of the X2 setup procedure for eNBs. In this respect, the setup request 510 format can be used for setting up a logical interface between eNBs. The X2 setup procedure is therefore the natural baseline for all these procedures in this specific LTE/NR context. Once there is a direct logical interface (Xn) setup or configured between two gNBs, they are considered as neighbouring gNBs. Embodiments of the disclosure also targets the gNB configuration update procedure between neighbour gNBs and could also be applicable to the eNB configuration update procedure over X2 or Xn. In general, the radio access network (RAN) may contain both gNB and NG-eNB, which may also be denoted NG-RAN nodes. It may further be noted that neighbour cell lists are provided in conventional solutions, in particular the X2 setup procedure, with relatively strict definition on what shall be counted as a neighbour cell, e.g. which has been reported in an automatic neighbour relation (ANR) procedure. In ANR a UE reports the identity of a cell during a measurement reporting process, so that the serving eNB can identify the neighbour eNB and potentially setup a new X2 interface.

In this disclosure, the grouping into sets of served cells shall allow more flexible relations to the defined in conventional solutions. To manage cell information shared between neighbouring network nodes, each network node keeps data structures which indicate which cell information it has shared with each other neighbouring network node. The data structures can contain sets of all the served cells of the network node, and information about which information is shared for each of the sets of cells. For each logical interface 702 a network node may keep multiple such sets of cells, where each set of cells contains different cells and the cell information shared between the network nodes for a specific set of cells may be different, i.e. the information elements that are being shared are defined differently for each set of cells. This could be used to share detailed information about cells that are direct neighbours and will be handling handover and interference coordination for connected client devices in one neighbour set of cells, while a larger set of cells can be defined for use in configuration of inactive mode mobility, where less information needs to be shared for each cell. Multiple sets of cells may be labelled (e.g. using numbering) to distinguish them from each other during signalling procedures.

Figure 6:
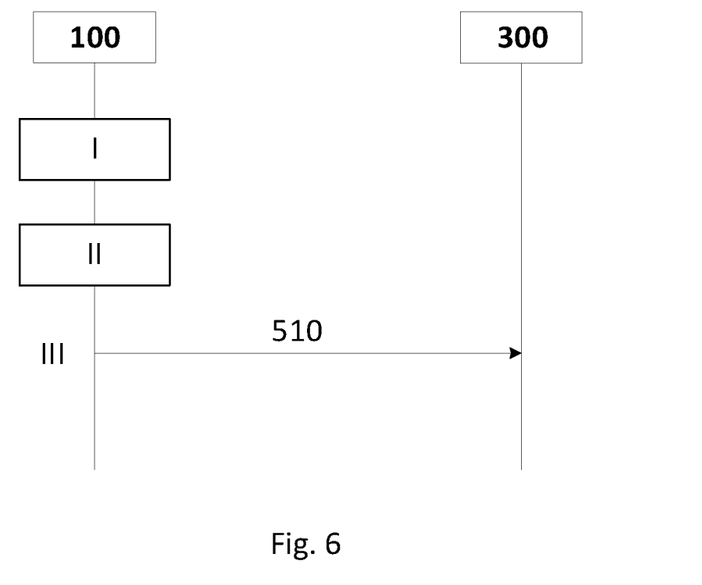
FIG. 6 shows a signalling diagram for an embodiment of the disclosure.

FIG. 6 shows a signalling diagram according to an embodiment of the disclosure. At step I the first network node 100 groups its served cells 602a, 602b, ..., 602n into two or more sets of cells, i.e. a first set of cells 610a, 610b, ..., 610n and at least one second set of cells 612a, 612b, ..., 612n. At step II a setup request 510 is generated and mentioned setup request 510 comprises a first indication indicating the first set of cells 610a, 610b, ..., 610n and their associated respective first set of cell information; and the at least one second set of cells 612a, 612b, ..., 612n and their associated respective second set of cell information. Finally, at step III the first network node 100 transmits/signals the setup request 510 to the second network node 300 which receives mentioned setup request 510 and derives the first indication therein. The information indicated by the first indication is used by the second network node 300 for further processing. In an example, the first set of cell information provides detailed served cell information, while the second set of cell information provides limited cell information.

Generally, the indications herein, such as denoted first indication and second indication, can be performed in a number of ways. In one example, the indication is explicit signalling. In another example, the indication is implicit signalling. The signalling can be performed using existing signalling protocols or message formats defined in standards. However, new signalling protocols or messages can also be used for the present indication.

The inclusion of a cell in a set can be indicated either by set indices indicated for each served cell in a signalling message or by a separate list of cells to be included in each neighbour set. In the first case, each cell could be included only once in the signalling message, but the information included for a cell would depend on which set of cells it belongs to. This would have the efficiency benefit that cells that are included in multiple sets of cells would not need to be repeated in sets of cells with less information elements shared.

However, from some perspective it may be considered simpler to provide separate lists of cells for each set of cells, even if the sets of cells are overlapping. In this case the list of cells for each set may include all the information elements required for the cells belonging to the set of cells. Alternatively, it would be possible to reduce the message size by not providing the same cell information repeatedly. For example, for a cell belonging to both a first set of cells $610a$, $610b$, . . . , $610n$ and a second set of cells $612a$, $612b$, . . . , $612n$ where the cell information for the first set of cells $610a$, $610b$, . . . , $610n$ is a superset of the second set of cells $612a$, $612b$, . . . , $612n$, it would be sufficient to indicate the cell ID in the second set of cells $612a$, $612b$, . . . , $612n$, as a reference that the second network node 300 could use to lookup the cell information for the cell.

In an embodiment, a set of cells could be defined as a single cell so that the first network node 100 may indicate e.g. the number of neighbours it would like to have information about for a specific served cell of the neighbour network node. In other words, the first network node 100 can make cell specific information requests using sets containing a single cell. Another possible set of cells could include all served cells of a network node. In particular, it may be preferable to always share some minimum information about all served cells of a network node, like the global cell identities and the physical cell identities. Some parameters for the sharing of information may be indicated as a general parameter for all the sets of cells of the logical interface, for example if neighbour information is included in the shared cell information there may be a common guideline on how to select the number of cells to include in the neighbour information.

In an embodiment, the first set of cell information and the second set of cell information differ in at least one information element. For example, the first set of cell information can comprise information elements (IE) IE1, IE2, IE3 whilst the second set of cell information can comprise information elements IE1, IE2, IE4. Therefore, first set of cell information and the second set of cell information differs in IE3 and IE4. Examples of information elements are the ones given in Table 1 previously described.

In an embodiment, the first set of cell information and the second set of cell information comprises different number of cell information elements. For example, the first set of cell information can comprise information elements IE1, IE2, IE3 whilst the second set of cell information can comprise information elements IE1, IE2, IE3, IE4. Therefore, second set of cell information comprises one more information element compared to the first set of cell information, namely IE4.

Figure 7:
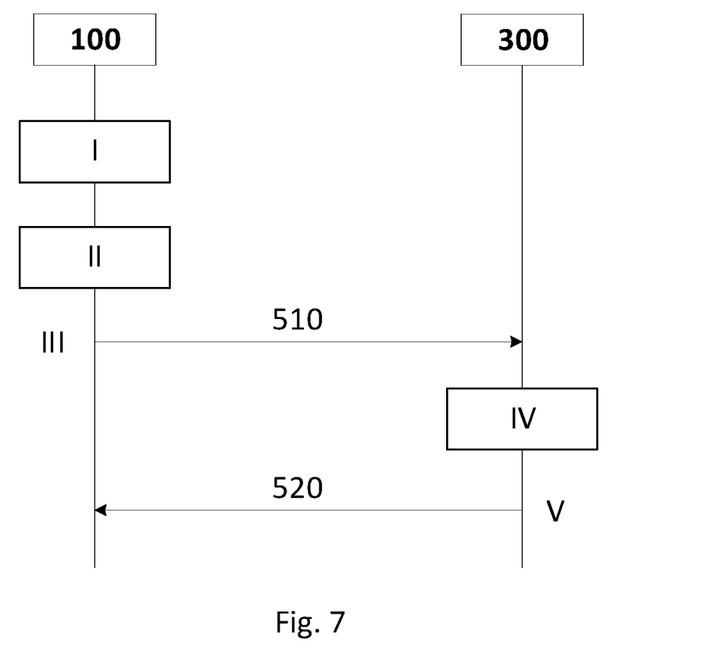
FIG. 7 shows another signalling diagram for an embodiment of the disclosure.

FIG. 7 shows a signalling diagram according to another embodiment of the disclosure. Steps I to III in FIG. 7 are the same as in FIG. 6 with the exception that in step II the setup request 510 also comprises a second indication. Mentioned second indication indicates that the first network node 100 wants cell information about one or more third sets of cells $622a$, $622b$, . . . , $622n$ served by the second network node 300. Hence, the cell information should in this case go from the second network node 300 to the first network node 100. At reception of the second indication the second network node 300 determines cell information about the cells of the third set of cells $622a$, $622b$, . . . , $622n$ at step IV in FIG. 7. The cell information about the cells of the third set $622a$, $622b$, . . . , $622n$ is transmitted at step V to the first network node 100 in a setup response 520. The first network node 100 receives the setup response 520 and derives the cell information for the third sets of cells indicated by the second indication therein. The information indicated by the second indication is used by the first network node 100 for further processing.

At step IV the second network node 300 generates a setup response 520 in response to the reception of the setup request 510. The setup response 520 comprises an indication of the at least one third set of cells $622a$, $622b$, . . . , $622n$ and their respective third set of cell information. At step V the second network node 300 transmits the setup response 520 to the first network node 100. Accordingly, the first network node 100 receives the setup response 520 from the second network node 300. Generally, the reception of the setup response 520 confirms the successful setup of the logical interface 702. If the setup of the logical interface 702 is not successful the second network node 300 will instead transmit a setup failure message to the first network node 100 (not illustrated in FIG. 7).

The first set of cells $610a$, $610b$, . . . , $610n$, the second set of cells $612a$, $612b$, . . . , $612n$ and the requested third set of cells $622a$, $622b$, . . . , $622n$ would constitute the initial sets of cells, which are defined by the first network node 100. In the current LTE solution the first network node 100 and the second network node 300 can include neighbour cell information, which includes cells that are served by other network nodes. This list of neighbour cell information in the current X2 setup procedure are provided to the second network node 300 to inform the second network node 300 about the cell neighbour relations detected by the first network node 100. In the current solution there is no restriction on the first set of cells $610a$, $610b$, . . . , $610n$, second set of cells $612a$, $612b$, . . . , $612n$ or third set of cells $622a$, $622b$, . . . , $622n$ to contain only cells that have been reported as neighbour cells. The existing neighbour cell information in LTE can still be included in the present setup request 510 and present setup response 520, as it is a complement to the cell information contained in the sets defined in the disclosure. In the first set of cells $610a$, $610b$, . . . , $610n$, the second set of cells $612a$, $612b$, . . . , $612n$ and further sets of cells containing its own served cells the first network node 100 can therefore include cells that do not have direct neighbour cells in the second network node 300. For example, the first network node 100 may include the full parameter set (e.g. all cell information elements) for a first set of cells $610a$, $610b$, . . . , $610n$ that has direct neighbours in the second network node 300, and a second set of cells $612a$, $612b$, . . . , $612n$ where the cell information is limited to a list of the cell identities of all its served cells. It may also include additional second sets of cells that could include cells that are on the same carrier frequency as the served cells of the second network node 300, or a set of cells that contain one cell from each frequency carrier served by the first network node 100, or a set of cells that contain all the cells in a certain radio access network notification area. Such additional second sets of cells may be provided with information elements that are useful for a specific purpose, e.g. it may include carrier frequency and bandwidth of the served cells, or it may include the physical cell identity (PCI) which can be used by the a neighbour network node to autonomously select PCIs for its own cells without causing interference, or it may include information about characteristics of all the cells in a radio access network notification area or tracking area to allow a neighbour network node to configure client devices in inactive mode, or it may include service specific information, such as MBMS information, to configure client devices that are using a specific service.

The setup request 510 may request multiple third sets of cells to be provided with different number of cells and information elements per cell. The third sets of cells refer to cells served by the second network node 300. However, the third set of cells is included in the setup request 510 with the purpose that the first network node 100 will receive cell information about the cells indicated in the third set of cells 622a, 622b, ..., 622n. The third sets of cells 622a, 622b, ..., 622n can be defined by the same type of characteristics as the first set of cells 610a, 610b, ..., 610n and second set of cells 612a, 612b, ..., 612n, and the cell information for the third sets of cells 622a, 622b, ..., 622n can be the same as in the first set of cells 610a, 610b, ..., 610n and the second sets of cells 612a, 612b, ..., 612n.

The third set of cells 622a, 622b, ..., 622n can be indicated by the first network node 100 in the second indication of the setup request 510 in a number of different ways. In an embodiment, the second indication relates to or comprises at least one of: a frequency carrier, a number of tiers, a radio access network notification area, and a tracking area. For example, the following cases are possible:

Frequency carrier: all cells on one frequency carrier or at least one cell for each frequency carrier used in cells served by the second network node 300.

Tiers: a number of tiers of neighbours of a cell.

Radio access network notification area: all cells in one radio access network notification area, i.e. all cells which have the same radio access network notification area code (RNAC). For example, RNAC 30 could be signalled as the second indication of a third set of cells to the second network node 300 which means that the second network node 300 shall include all of its served cells that belong to the radio access network notification area 30 in one third set of cells in the setup response 520 to the first network node 100.

Tracking area: all cells in a tracking area. For example, the third set of cells characterized as cells belonging to a certain tracking area, e.g. tracking area 20. Hence, "tracking area 20" could be signalled to the second network node 300 which means that the second network node 300 should include all cells that belong to tracking area 20 in one third set of cells in the setup response 520.

Other solutions to indicate the third set of cells 622a, 622b, ..., 622n can be:

Cell identities: a list of cell identities is indicated defining the cells to be grouped in the third set of cells 622a, 622b, ..., 622n.

Distance: a distance measure can used to define the cells to be grouped in the third set of cells 622a, 622b, ..., 622n. Mentioned distance could be some abstract measure, such as near/medium/far in terms of network topology, or number of transmission and reception point tiers, or a signal attenuation level, or defined as a physical spatial distance between cells.

In yet another solution the first network node 100 can use a timer to indicate the third set of cells 622a, 622b, ..., 622n, and the second network node 300 includes the cells which a client device may move into during that time interval given by the timer if it follows normal client device mobility patterns. This would be useful to configure an inactive client device which has long DRX sleep periods with sufficient number of cells so that it can be paged before leaving the configured cells. Which cells to include in the setup response 520 and in the third set of cells 622a, 622b, ..., 622n can be decided by second network node 300, e.g. based on typical mobility patterns and the neighbour relations of its own served cells.

In yet another solution the first network node 100 may indicate that it would like the third set of cells 622a, 622b, ..., 622n to be selected so that they represent all different configurations of a cell parameter that are used in the second network node 300. For example, this could refer to a set of cells that include at least one cell from each carrier frequency used in the second network node 300, or it could be used to indicate that at least one cell representing each carrier bandwidth used for any cell in the second network node 300 shall be included in the third set of cells 622a, 622b, ..., 622n.

Generally, the second network node 300 needs to determine which information shall be included in the setup response 520 for cells in the third set of cells 622a, 622b, ..., 622n. Therefore, according to an embodiment of the disclosure, the second indication further indicates a third set of cell information associated with the at least one third set of cells 622a, 622b, ..., 622n. This implies a remote control mechanism used by the first network node 100 for defining the sought after third set of cell information from the second network node 300. The third set of cell information can be the same as the first set of cell information or the second set of cell information, but can also relate to different cell information. The remote control mechanism can be solved in a different number of ways. One solution is the use of clearly defined cell information subgroups that are directly indicated in the setup request 510. Such cell information subgroups could be defined in specifications, and efficiently encoded in the setup request 510. Another mechanism would be to include a list of the information elements in the setup request 510 when a new third set of cells is requested. This would allow more flexibility but increase the signalling overhead and complexity. A third solution is that for set of cells with defined sets of cell information that are already present in the setup request 510, i.e. sets that the first network node 100 is using to classify its own served cells, the second network node 300 would use the same information elements in the setup response. This would save signalling but it would require an additional solution to support setup of new third sets of cells that are not part of the third sets of cells signalled in the setup request 510.

In one embodiment, the setup request 510 may include a third set of cells defined relative to a served cell of the first network node 100. Hence, the second indication could include a cell identity of an indicated target cell, which could be either a cell served by the first network node 100 or a cell served by the second network node 300. The second network node 300 would select the cells to be included in the third set of cells relative to the indicated target cell. The third set of cells could e.g. be defined as the served cells of the second network node 300 that are neighbours of the indicated target cell. The cell information to be shared for the cells in the third set of cells may also include the neighbour information for the cells in the third set of cells. In this way, the ANR learning process can be faster since neighbour network nodes share their view of a specific cell relation, and targeted measurements can be configured, e.g. inter-RAT or inter-frequency.

Figure 8:
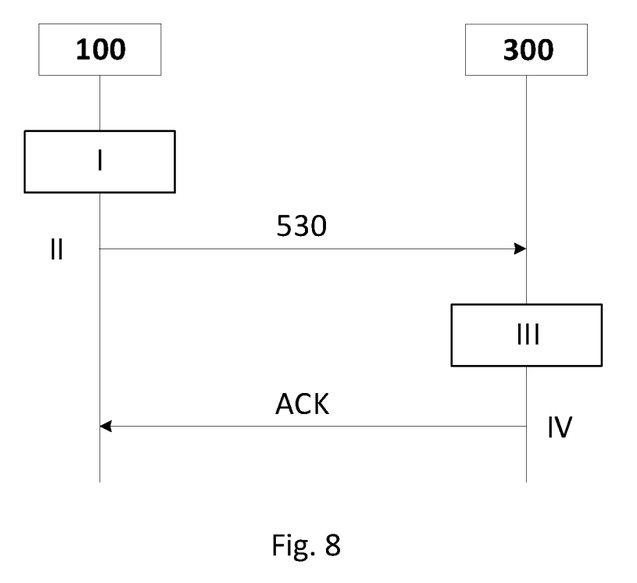
FIG. 8 shows yet another signalling diagram for an embodiment of the disclosure.

FIG. 8 shows a signalling diagram according to yet another embodiment of the disclosure. In this embodiment a re-configuration request 530 is introduced. At step I the first network node 100 generates a re-configuration request 530 associated with the at least one third set of cells 622a, 622b, ..., 622n. The re-configuration request 530 instructs at least one of a removal of a cell served by the second network node 300 from the at least one third set of cells 622a, 622b, ..., 622n or an adding a cell served by the second network node 300 to the at least one third set of cells 622a, 622b, ..., 622n. The re-configuration request 530 is transmitted to the second network node 300 at step II. At reception of the re-configuration request 530 the second network node 300 updates the at least one third set of cells 622a, 622b, ..., 622n according to the re-configuration request 530 at step III. Finally, at step IV the second network node transmits an acknowledgement (ACK) associated with the re-configuration request 530 to the first network node 100.

The re-configuration request 530 can in the more general case be sent by either the first network node 100 or the second network node 300. Once the logical interface 702 has been setup between the first network node 100 and the second network node 300 the signalling procedures between the network nodes do not need to make any distinction between the network node that initiated the interface setup by transmitting a setup request 510 and the network node that responded to the setup request 510.

The first, second and third sets of cells need to be maintained during the lifetime of the logical interface 702. For example, the network topology may need to change due to cell reconfigurations, handover optimization, or changes in the physical environment. This maintenance of the sets of cells is the purpose of the re-configuration request 530. In particular, in the re-configuration request 530 of the first network node 100 may:

Indicate cells that are currently in a set of cells with a flag to indicate that the cell should be removed from the set of cells.

Provide information for a cell that shall be added to a set of cells.

Request that the second network node 300 provides the cell information for all its served sells in a set of cells.

The re-configuration request 530 could also include the possibility to define new third sets of cells, with new cell information sets to be shared. This can be used when new features are being introduced that require additional information about some set of cells. The signalling for this would be similar to the second indication that is included in the setup request 510 to create a third set of cells with specific shared cell information.

Figure 9:
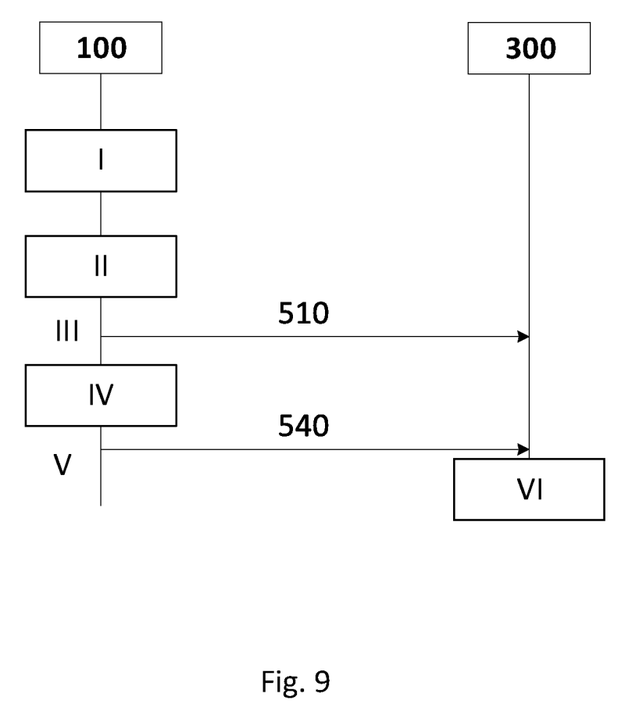
FIG. 9 shows yet another signalling diagram for an embodiment of the disclosure.

FIG. 9 shows a signalling diagram according to yet another embodiment of the disclosure. Steps I to III are the same as in FIG. 6. However, in this embodiment a cell information update mechanism is further introduced.

Therefore, at step IV the first network node 100 updates the cell information for a cell of the first set of cells 610a, 610b, ..., 610n or the at least one second set of cells 612a, 612b, ..., 612n. Thereafter, a network node configuration update 540 is generated comprising the updated cell information for the cell if the cell belongs to the first set of cells 610a, 610b, ..., 610n and the updated cell information belongs to the first set of cell information, or if the cell belongs to the at least one second set of cells 612a, 612b, ..., 612n and the updated cell information belongs to the second set of cell information. At step V the first network node 100 transmits the network node configuration update 540 to the second network node 300. The second network node 300 at step VI updates its stored information about said cell so that it has updated information about the cells of the first network node 100.

Generally, when a network node updates the cell information for its served cells it needs to inform its neighbour network nodes about such updates, if the neighbour nodes are keeping information about the cell information that is being updated. However, if the cell information that is being updated is not part of the information elements that are being shared for the cell, i.e. if the cell belongs to a set where the information elements are not part of the cell information transmitted in the setup request 510, there is no need to send it in any network node configuration update 540 either. Hence, network node configuration update 540 comprises information about the cells that have updates to information elements that are part of the cell information that is being shared for cells in the specific set they belong to. It may also be indicated in the network node configuration update 540 which set of cells a specific cell belongs to.

The network nodes can also send network node configuration updates between each other to keep the information about the cell configurations up to date. According to an embodiment the re-configuration request 530 is added in the network node configuration update 540 to maintain the sets of cells during the network node configuration update procedure.

The re-configuration update procedure could also be extended with a response message that allows more feedback from the second network node 300, i.e. not only to confirm that it has accepted the updated re-configuration information, but also to respond to requests for cell information. Hence, the response message comprises the ACK plus additional information. It is then possible to request an update (or refresh) of cell information about a cell or a third set of cells, regardless of whether second network node 300 have any changes for the cell or set of cells. This option can be used in case a network node has lost cell information or suspect that it does not have correct cell information about a cell or a third set of cells. This could e.g. happen in response to identified errors or performance problems.

As an example, a network node may find that a cell that has been initially included in a set of direct neighbours never have any handover interactions with any cell of a neighbour network node. If the cell is being activated and deactivated for energy saving purposes it would still require that this is signalled using a network node configuration update 540 every time if the cell is in the direct neighbour set. The first network node may therefore send a re-configuration request 530 where the cell is removed from the set of direct neighbours, and instead added to another set of cells where the information about cell activation and deactivation is not included in the shared cell information.

In another example, a network node may use the knowledge of cells that exist in a larger set of cells and request additional information about this cell by adding the cell to a set with more detail cell information, and delete it from the larger set of cells. Alternatively, a request to move the cell from one set of cells to a different set of cells could be used.

In further embodiments of the disclosure, the setup request 510, the setup response 520, the re-configuration request 530, or the network node configuration update 540 may include a full set of cells in each transmitted signalling message, where message here refers to any of the setup request 510, the setup response 520, the re-configuration request 530, and the network node configuration update 540. For example, if an update is made for one cell in a set of cells, or a cell is added or deleted from a set of cells, all the cells in the set of cells could be included in a re-configuration request 530. That would make sure that the two network nodes always have the same cells included in the set of cells, however at the cost of increased signalling. Alternatively, the re-configuration request 530 and the network node configuration update 540 may include only the served cells where there are changes, and not the full neighbour set of cells. In this case the setup request 510, or the re-configuration request 530, or the network node configuration update 540 also includes a possibility to indicate that the second network node 300 shall include all the cells in specific requested sets in its setup response 520 transmitted to the first network node 100.

Finally, it is to be noted that a setup request 510, a setup response 520, a re-configuration request 530, and a network node configuration update 540 herein sometimes are denoted a setup request message 510, a setup response message 520, a re-configuration request message 530, and a network node configuration update message 540, respectively.

A client device herein may e.g. be any of a User Terminal (UT), a User Equipment (UE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

The first network node 100 and the second network node 300 herein may also be denoted as a radio network access node, an access network access node, an access point, or a base station, e.g. a Radio Base Station (RBS), which in some networks may be referred to as transmitter, "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first network node 100 and the second network node 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the first network node 100 and the second network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all implementations within the scope of the appended independent claims.

What is claimed is:

1. A communication method implemented by a first network node for a wireless communication system, the method comprising:
grouping cells served by the first network node into a first set of cells and at least one second set of cells, wherein the cells in the first set of cells are associated with a first set of cell information and the cells in the second set of cells are associated with a second set of cell information, wherein the first set of cell information and the second set of cell information are different sets of cell information;
generating a setup request comprising a first indication indicating the first set of cells and the respective first set of cell information and the second set of cells and the respective second set of cell information;
transmitting the setup request to a second network node; and
grouping the cells served by the first network node into the first set of cells and the at least one second set of cells based on a distance between a cell of the cells served by the first network node and a cell served by the second network node.

2. The method according to claim 1, wherein the first set of cell information and the second set of cell information differ in at least one information element.

3. The method according to claim 2, wherein the first set of cell information and the second set of cell information comprises a different number of cell information elements.

4. The method according to claim 1, wherein the setup request further comprises a second indication indicating at least one third set of cells served by the second network node.

5. The method according to claim 4, wherein the at least one third set of cells is indicated by at least one of: a frequency carrier, a number of tiers, a radio access network notification area, or a tracking area.

6. The method according to claim 4, wherein the second indication further indicates a third set of cell information associated with the at least one third set of cells.

7. The method according to claim 4, configured to:
receive a setup response from the second network node in response to the transmission of the setup request to the second network node, wherein the setup response comprises an indication of the at least one third set of cells and their respective third set of cell information.

8. The method according to claim 7, the method comprising:
generating a re-configuration request associated with the at least one third set of cells, wherein the re-configuration request instructs at least one of a removal of a cell served by the second network node from the at least one third set of cells or an adding of a cell served by the second network node to the at least one third set of cells; and
transmitting the re-configuration request to the second network node.

9. The method according to claim 1, the method comprising:
updating cell information for a cell of the first set of cells or the at least one second set of cells;
generating a network node configuration update comprising the updated cell information for the cell based upon the cell belonging to the first set of cells and the updated cell information belonging to the first set of cell information, or based upon the cell belonging to the at least one second set of cells and the updated cell information belonging to the second set of cell information; and
transmitting the network node configuration update to the second network node.

10. A non-transitory computer-readable storage medium, wherein the computer-readable storage medium stores a computer program, and when the computer program runs on a computer, the computer is enabled to perform the method implemented by the first network node according to claim 1.

11. A communication method implemented by a second network node for a wireless communication system, the method comprising:
receiving a setup request from a first network node, wherein the setup request comprises a first indication indicating a first set of cells served by the first network node and their respective first set of cell information and at least one second set of cells served by the first network node and their respective second set of cell information, wherein the first set of cell information and the second set of cell information are different sets of cell information, and each of the first set of cell information and the second set of cell information comprises one or more information elements,
wherein the first set of cells and the at least one second set of cells are grouped from cells served by the first network node, based on a distance between a cell of the cells served by the first network node and a cell served by the second network node.

12. The method according to claim 11, wherein the setup request further comprises a second indication indicating at least one third set of cells served by the second network node; and wherein the method comprises:
generating a setup response in response to the reception of the setup request, wherein the setup response comprises an indication of the at least one third set of cells and their respective third set of cell information; and
transmitting the setup response to the first network node.

13. The method according to claim 12, wherein the at least one third set of cells is indicated by at least one of: a frequency carrier, a number of tiers, a radio access network notification area, or a tracking area.

14. The method according to claim 13, the method comprising:
receiving a re-configuration request associated with the a least one third set of cells from the first network node, wherein the re-configuration request instructs at least one of a removal of a cell served by the second network node from the at least one third set of cells or an adding of a cell served by the second network node to the at least one third set of cells;
updating the at least one third set of cells according to the re-configuration request; and
transmitting an acknowledgement associated with the re-configuration request to the first network node.

15. The method according to claim 12, wherein the second indication further indicates the third set of cell information associated with the at least one third set of cells.

* * * * *